United States Patent
Wang

(10) Patent No.: US 10,933,513 B2
(45) Date of Patent: Mar. 2, 2021

(54) OPENING-CLOSING DEVICE

(71) Applicants: HANGZHOU GREAT STAR INDUSTRIAL CO., LTD., Hangzhou (CN); HANGZHOU GREAT STAR TOOLS CO., LTD., Hangzhou (CN)

(72) Inventor: Min Wang, Hangzhou (CN)

(73) Assignees: HANGZHOU GREAT STAR TOOLS CO., LTD., Hangzhou (CN); HANGZHOU GREAT STAR INDUSTRIAL CO., LTD, Hangzhou (CN)

( * ) Notice: Subject to any disclaimer, the term of this patent is extended or adjusted under 35 U.S.C. 154(b) by 0 days.

(21) Appl. No.: 16/492,050

(22) PCT Filed: Mar. 9, 2017

(86) PCT No.: PCT/CN2017/076209
§ 371 (c)(1),
(2) Date: Sep. 9, 2019

(87) PCT Pub. No.: WO2018/161325
PCT Pub. Date: Sep. 13, 2018

(65) Prior Publication Data
US 2020/0030945 A1    Jan. 30, 2020

(51) Int. Cl.
*B25B 7/10* (2006.01)
*B25B 7/12* (2006.01)
(Continued)

(52) U.S. Cl.
CPC ................. *B25B 7/10* (2013.01); *B25B 7/12* (2013.01); *B23D 29/023* (2013.01); *B25B 7/22* (2013.01)

(58) Field of Classification Search
CPC .... B25B 7/06; B25B 7/12; B25B 7/22; B26B 13/26; B26B 17/02
See application file for complete search history.

(56) References Cited

U.S. PATENT DOCUMENTS 9,061,398 B2 * 6/2015 Poole ..................... B25B 7/12
10,406,656 B2 * 9/2019 Wang ..................... B25B 7/14
(Continued)

FOREIGN PATENT DOCUMENTS

| CN | 204248693 U | 4/2015 |
| CN | 106141947 | 11/2016 |
| CN | 106181805 A | 12/2016 |

*Primary Examiner* — David B. Thomas
(74) *Attorney, Agent, or Firm* — Cochran Freund & Young LLC; William W. Cochran

(57) ABSTRACT

The present invention provides an opening-closing device including a first component, a second component and a third component. The second component is rotatably connected with the first component, and the third component is rotatably connected with the second component. The present invention further includes a mode switching device for switching operating modes of the opening-closing device. The operating modes include a conventional mode and a labor-saving mode. When the opening-closing device is in the conventional mode, the third component is fixed relative to the second component. When the opening-closing device is in the labor-saving mode, the third component is rotated in the opening direction relative to the second component during opening of the opening-closing device, and the third component is rotated in the closing direction relative to the second component during closing of the opening-closing device.

10 Claims, 10 Drawing Sheets

(51) Int. Cl.
 *B25B 7/22* (2006.01)
 *B23D 29/02* (2006.01)

(56) References Cited

U.S. PATENT DOCUMENTS

| | | |
|---|---|---|
| 2001/0007214 A1 | 7/2001 | Liou |
| 2011/0258860 A1* | 10/2011 | Chervenak .............. B26B 17/02 30/266 |
| 2012/0096994 A1* | 4/2012 | Poole ...................... B26B 13/26 81/342 |
| 2012/0144963 A1* | 6/2012 | He ........................... B25B 7/12 81/381 |

* cited by examiner

OPENING-CLOSING DEVICE

FIELD OF THE INVENTION

The present invention relates to the technical field of hand tools, and in particular to an opening-closing device which can be switched between a conventional mode and a labor-saving mode.

DESCRIPTION OF THE PRIOR ART

An opening-closing device generally refers to a device using lever principle to implement the clamping or cutting function, and includes various kinds of clamping or cutting tools such as scissors, tweezers and pliers.

In the prior art, the structure of the conventional tool pliers mainly includes pliers handles, a pliers head and a shaft pin, and the opening angle of the pliers handles remains consistent with the opening angle of the pliers head, and the magnification of the magnitude of the applied force of the product to be cut on the inner side of the pliers head relative to the magnitude of the applying force of the user on the outer side of the pliers handles is proportional to the distance between the shaft pin and the applying force points on the pliers handles, and is inversely proportional to the distance between the shaft pin and the applied force points on the pliers head.

In some of the existing labor-saving opening-closing devices, such as labor-saving pliers, the pliers handles of which are shaped to be curved towards the outside, and the opening angel of the pliers handles thereof can be adjusted to be greater than that of the pliers handles of the conventional tool pliers, or the fulcrum position in the lever system is adjusted so that the magnification of the force can be greater, thus achieving a labor-saving effect. However, the shortcoming of the existing labor-saving opening-closing devices lies in that the application is limited, they can only be applied to special occasions, and are not convenient to use in most conventional occasions. If the diameter of the product to be cut is small or the hardness thereof is low, the conventional tool pliers can meet the need; if the labor-saving pliers is used, the opening angle of the pliers handles is too large, and the operation is inconvenient, causing poor user experience, not as convenient as using the conventional pliers.

Thus, in a particular application of the opening-closing device, there is a need for a technical solution of a dual-function opening-closing device which may be provided with two operating modes of conventional pliers and labor-saving pliers and which may be easily switched between the two operating modes, so as to achieving the technical effects of both tools in one hand tool.

SUMMARY OF THE INVENTION

An object of the present invention is to provide an opening-closing device which solves the technical problems that the prior art labor-saving opening-closing device is inconvenient to use in the conventional occasions and has single function, and the like.

In order to solve the above technical problems, the present invention provides an opening-closing device including a first component, a second component and a third component; the second component is rotatably connected with the first component, and the third component is rotatably connected with the second component. The present invention further includes a mode switching device for switching operating modes of the opening-closing device; and the operating modes include a conventional mode and a labor-saving mode. When the opening-closing device is in the conventional mode, the third component is fixed relative to the second component; and when the opening-closing device is in the labor-saving mode, the third component is rotated in the opening direction relative to the second component during opening of the opening-closing device, and the third component is rotated in the closing direction relative to the second component during closing of the opening-closing device.

Further, in a different embodiment, the first component includes a first clamping portion and a first handheld portion; the second component includes a second clamping portion provided opposite to the first clamping portion; and the third component includes a second handheld portion provided opposite to the first handheld portion; and the first clamping portion and the second clamping portion are rotatably connected via a first pin shaft.

Further, in a different embodiment, the mode switching device is provided at a joint between the first component and the second component and a joint between the second component and the third component.

Further, in a different embodiment, the second component and the third component are locked and remain fixed relative to each other when the opening-closing device is in the conventional mode; the second component and the third component are unlocked when the opening-closing device is in the labor-saving mode.

Further, in a different embodiment, the mode switching device includes a first switching portion with one end thereof connected to the first clamping portion and the other end thereof connected to the first handheld portion; a second switching portion connected to the second clamping portion; and a third switching portion connected to the second handheld portion; wherein the second switching portion and the third switching portion are rotatably connected via a second pin shaft.

Further, in a different embodiment, the third switching portion includes a first clamping plate connected to the second handheld portion; a second clamping plate connected to the second handheld portion and parallel to the first clamping plate; a clamping plate gap provided between the first clamping plate and the second clamping plate; a first slide hole extending through the first clamping plate; and a second slide hole extending through the second clamping plate.

Further, in a different embodiment, the first slide hole is an arc-shaped hole; the arc-shaped hole is a part of a ring whose center is located on the shaft axis of the first pin shaft.

Further, in a different embodiment, the second slide hole is a kidney-shaped hole; and the second pin shaft is located on the straight line on which the center line of the second slide hole is located.

Further, in a different embodiment, the third switching portion includes a first press groove provided on the outer side of the first clamping plate and communicated with the first slide hole; and a second press groove provided on the outer side of the second clamping plate and communicated with the second slide hole.

Further, in a different embodiment, the first switching portion includes a third clamping plate inserted into the clamping plate gap; and a gear shaft hole extending through the third clamping plate; wherein the projection of the first slide hole on the third clamping plate forms an intersecting region with the projection of the second slide hole on the third clamping plate; and the gear shaft hole is provided within the intersecting region.

Further, in a different embodiment, the mode switching device further includes a gear shaft inserted into the gear shaft hole and inserted into the first slide hole or the second slide hole; the gear shaft slides within the first slide hole during opening or closing of the opening-closing device when the opening-closing device is in the conventional mode; and the gear shaft slides in the second slide hole during opening or closing of the opening-closing device when the opening-closing device is in the labor-saving mode.

Further, in a different embodiment, the gear shaft includes a kidney-shaped slot vertically provided on the side wall of the gear shaft; and two gear pockets provided on the bottom of the kidney-shaped slot.

Further, in a different embodiment, the first switching portion further includes a first shaft pin hole extending through the side wall of the gear shaft hole, and the inner side wall of which is provided with shaft pin thread; a positioning pin with the outer side wall thereof provided with positioning pin thread corresponding to the shaft pin thread; a first positioning ball snapped into either of the gear pockets; and a first positioning spring with one end thereof tangent to the first positioning ball and the other end thereof tangent to the positioning pin; wherein the first positioning ball, the first positioning spring, and the positioning pin are provided, sequentially from inner to outer, within the first shaft pin hole.

Further, in a different embodiment, the two gear pockets are a first gear pocket and a second gear pocket, respectively; and the opening-closing device is in the conventional mode when the first positioning ball is snapped into the first gear pocket; and the opening-closing device is in the labor-saving mode when the first positioning ball is snapped into the second gear pocket.

Further, in a different embodiment, the second switching portion includes a fourth clamping plate inserted into the clamping plate gap; wherein the second pin shaft sequentially passes through the first clamping plate, the fourth clamping plate and the second clamping plate.

Further, in a different embodiment, the second switching portion includes a second shaft pin hole extending through the fourth clamping plate; and the third switching portion further includes a third shaft pin hole extending through the first clamping plate; and a fourth shaft pin hole extending through the second clamping plate; wherein the second pin shaft sequentially passes through the third shaft pin hole, the second shaft pin hole and the fourth shaft pin hole.

Further, in a different embodiment, the mode switching device further includes a stop hole extending through the first clamping plate; a second positioning ball snapped into the stop hole; a stop groove recessed down to the surface of the fourth clamping plate, and the groove opening of the stop groove corresponds to the stop hole; and a second positioning spring with one end tangent thereof to the second positioning ball and the other end thereof tangent to the bottom surface of the stop groove; wherein the second positioning spring and the second positioning ball are provided, sequentially from inner to outer, within the stop groove.

Further, in a different embodiment, the opening-closing device includes, but is not limited to, scissors or pliers.

An advantage of the present invention is to provide an opening-closing device having two functions of a labor-saving opening-closing device with a larger handles opening angle and a conventional opening-closing device, such as labor-saving pliers and conventional tool pliers, and having a labor-saving mode and a conventional mode, the two operating modes are easily switched by means of a mode switching device, so that a user may choose a mode based on actual needs. The invention can effectively solve the technical problems that the prior art labor-saving opening-closing device may only be available for some special occasions, is inconvenient to use in the conventional occasions, has single function, and the like.

Figure 1:
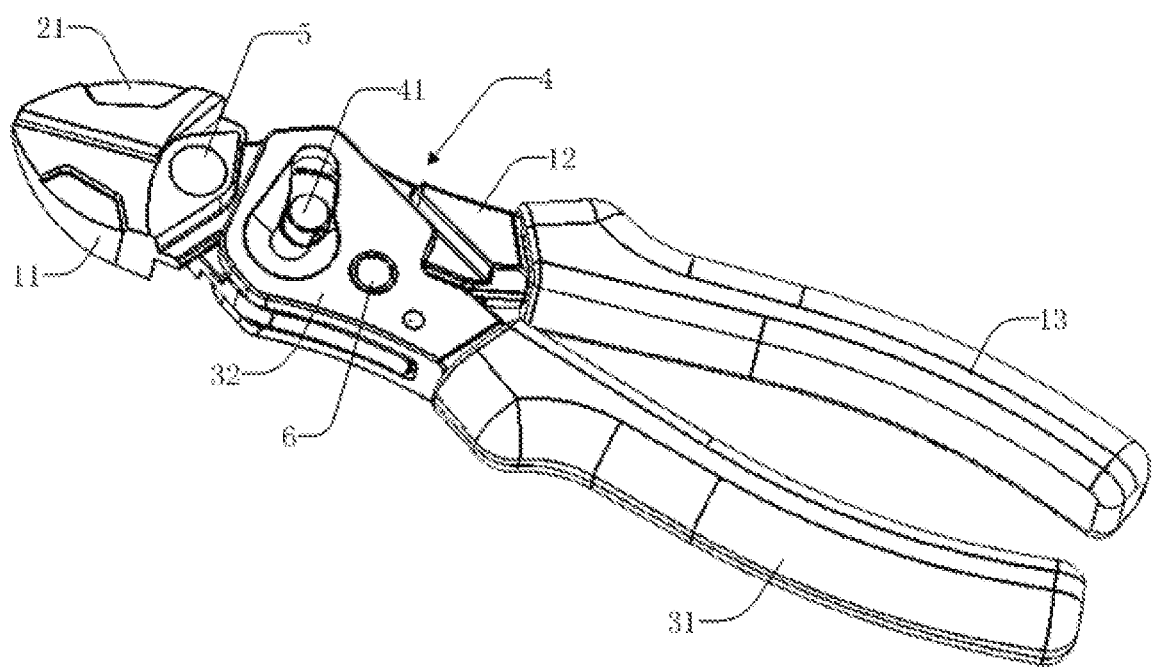
FIG. 1 is a schematic view of the front structure of the embodiment of the present invention in the closed state.
Figure 2:
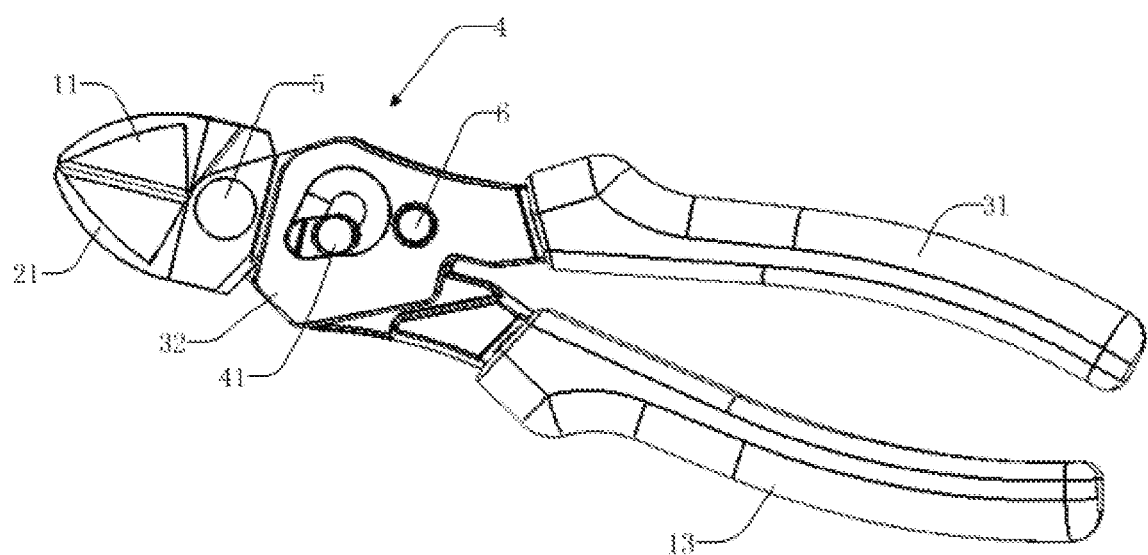
FIG. 2 is a schematic view of the back structure of the embodiment of the present invention in the closed state.
Figure 3:
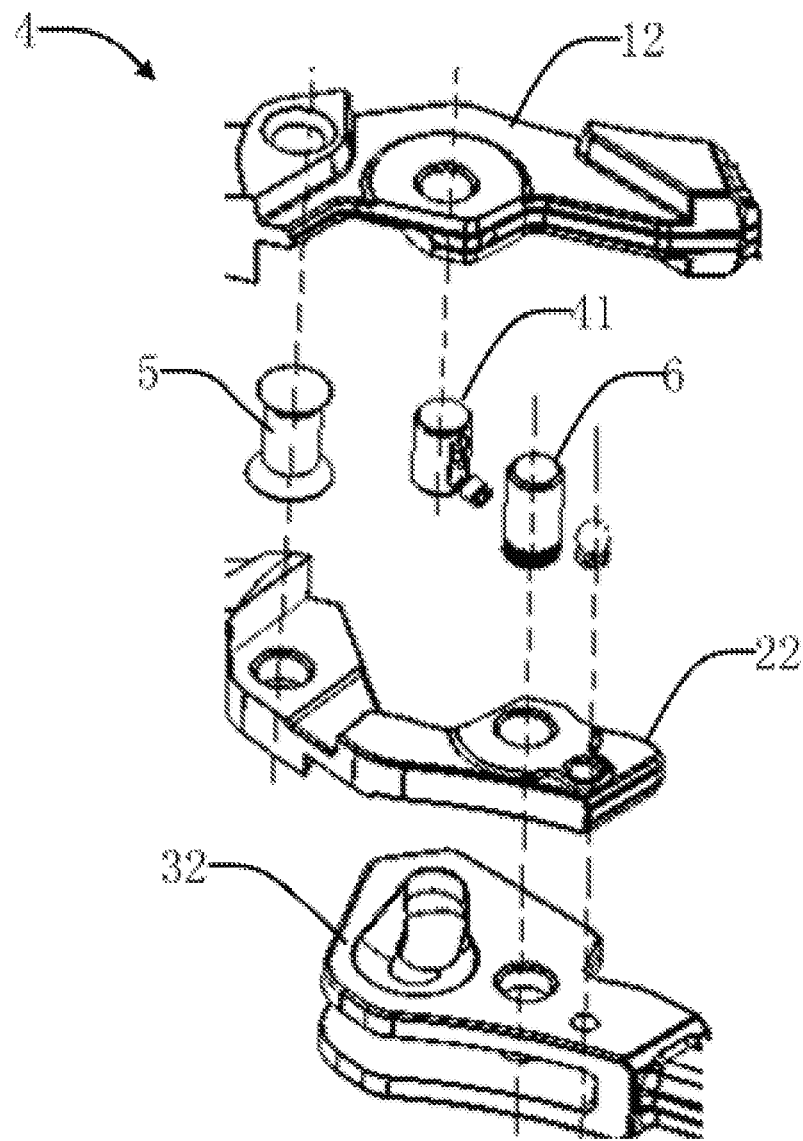
FIG. 3 is an exploded schematic view of a mode switching device according to the embodiment of the present invention.
Figure 4:
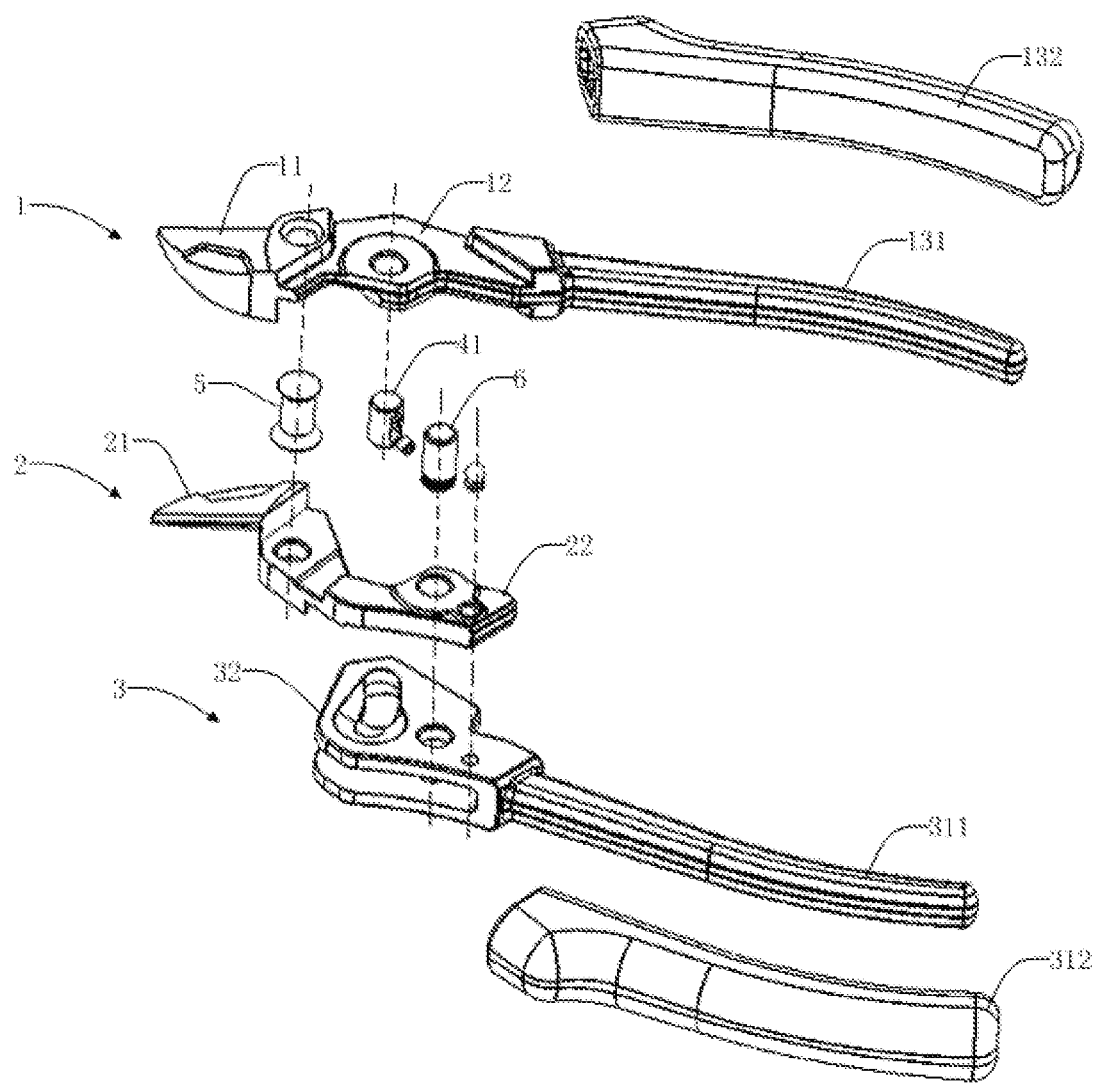
FIG. 4 is an exploded schematic view of the embodiment of the present invention in one state.

The reference numerals of the components in the drawings are as follows:

1 first component, 2 second component, 3 third component; 4 mode switching device, 5 first pin shaft, 6 second pin shaft, 7 wire product; 11 first clamping portion, 12 first switching portion, 13 first handheld portion; 21 second clamping portion, 22 second switching portion; 31 second handheld portion, 32 third switching portion, 41 gear shaft; 51 stop hole, 52 second positioning ball, 53 stop groove, 54 second positioning spring; 121 third clamping plate, 122 gear shaft hole, 123 first shaft pin hole; 124 positioning pin, 125 first positioning ball, 126 first positioning spring; 221 fourth clamping plate, 222 second shaft pin hole; 321 first clamping plate, 322 second clamping plate, 323 clamping plate gap; 324 first slide hole, 325 second slide hole, 326 third shaft pin hole, 327 fourth shaft pin hole; 328 first press groove, 329 second press groove; 411 kidney-shaped slot, 412 first gear pocket, 413 second gear pocket.

DETAILED DESCRIPTION OF THE PREFERRED EMBODIMENTS

The present invention will be described more fully hereinafter with reference to the accompanying drawings, in which preferred embodiments of the invention are shown, for the purpose clarity and better understanding of the techniques. This invention may be embodied in various different forms and the invention should not be construed as being limited to the embodiments set forth herein.

In the description which follows elements with identical structure are marked with the same reference numerals, and like elements with similar structure or function are marked throughout with the same reference numerals, respectively. The dimension and thickness of each of the elements in the accompanying drawings are not necessarily to scale and certain elements may be shown somewhat exaggerated in thickness in the interest of clarity.

Directional terms described by the present invention, such as upper, lower, front, back, left, right, inner, outer, side, top, bottom, upper end, lower end, terminal end and etc., are only directions by referring to the accompanying drawings, and are thus used to describe and understand the present invention, but the present invention is not limited thereto.

It will be understood that when an element is referred to as being "on" another element, it can be directly on the other element, or there may be an intermediate element to which it is attached, and the intermediate element is attached to the other element. When an element is referred to as being "mounted to" or "connected to" another element, either one can be understood as being directly "mounted" or "connected", or via an intermediate element to be indirectly "mounted to" or "connected to" the other element.

As shown in FIGS. 1 to 5, the opening-closing device according to the present embodiment includes, but is not limited to, scissors or pliers, and specifically includes a first component 1, a second component 2 and a third component 3. The second component 2 is rotatably connected with the first component 1; and the third component 3 is rotatably connected with the second component 2.

The first component 1 includes a first clamping portion 11, a first switching portion 12 and a first handheld portion 13; the second component 2 includes a second clamping portion 21 and a second switching portion 22; and the third component 3 includes a second handheld portion 31 and a third switching portion 32. The first handheld portion 13 is provided opposite to the second handheld portion 31; the first clamping portion 11 is provided opposite to the second clamping portion 21, the first clamping portion 11 and the second clamping portion 21 are rotatably connected via a first pin shaft 5, the two clamping portions can clamp or cut an article, such as a wire product 7.

The opening-closing device according to the present embodiment further includes a mode switching device 4 which is provided at a joint between the first component 1 and the second component 2 and a joint between the second component 2 and the third component 3. The mode switching device 4 is used for switching operating mode of the opening-closing device, the operating mode includes a conventional mode and a labor-saving mode, and the mode switching device 4 can cause the operating mode of the opening-closing device to be easily switched between the conventional mode and the labor-saving mode.

The second component 2 and the third component 3 are locked together and remain fixed relative to each other when the opening-closing device is in the conventional mode. The angle formed after the two clamping portions 11 and 21 are opened is the same as the angle formed after the two handheld portions 13 and 31 are opened, when the opening-closing device is opened. The two handheld portions 13, 31 are closed when the opening-closing device is closed, which drives the two clamping portions 11, 21 to also be closed for clamping or cutting an article.

When the opening-closing device is in the labor-saving mode, the second component 2 and the third component 3 are unlocked, and may be rotated relative to each other within a certain angular range. During opening of the opening-closing device, the second component 2 is rotated in the opening direction relative to the first component 1; the third component 3 is rotated in the opening direction relative to the second component 2; and the angle formed after two handheld portions 13, 31 are opened is greater than the angle formed after the two clamping portions 11 and 21 are opened. Compared with the conventional mode, the opening angle of the two handheld portions is greater, so as to achieve a labor-saving effect in the subsequent closing process. During closing of the opening-closing device, the two handheld portions 13, 31 are closed, the second component 2 is rotated in the closing direction relative to the first component 1, and the third component 3 is rotated in the closing direction relative to the second component 2, which drives the two clamping portions 11, 21 to also be closed for clamping or cutting an article. According to the lever principle, the opening-closing device, such as ordinary tool pliers, can enlarge the pushing force applied to the outer side of the two handheld portions to the inner side of the clamping portions, and the specific magnification thereof is related to an applying force position and an applied force position, and the specific force analysis is described in detail below.

The mode switching device 4 includes the first switching portion 12, the second switching portion 22 and the third switching portion 32 described above, one end of the first switching portion 12 is connected to the first clamping portion 11 and the other end thereof is connected to the first handheld portion 13; the second switching portion 22 is connected to the second clamping portion 21; the third switching portion 32 is connected to the second handheld portion 31; and the second switching portion 22 and the third switching portion 32 are rotatably connected via a second pin shaft 6.

As shown in FIGS. 3 to 7, the third switching portion 32 includes a first clamping plate 321 and a second clamping plate 322 which are parallel to each other and are provided opposite to each other, which are connected to the second handheld portion 31; and a clamping plate gap 323 is provided between the first clamping plate 321 and the second clamping plate 322. The third switching portion 32 further includes a first slide hole 324 and a second slide hole 325, the first slide hole 324 extends through the first clamping plate 321, and the second slide hole 325 extends through the second clamping plate 322. The first slide hole 324 is an arc-shaped hole; and the arc-shaped hole is a part of a ring whose center is located on the shaft axis of the first pin shaft 5. The second slide hole 325 is a kidney-shaped hole; and the second pin shaft 6 is located on the straight line where the center line of the second slide hole 32 is located.

The first switching portion 12 includes a third clamping plate 121 and a gear shaft hole 122, the third clamping plate 121 is inserted into the clamping plate gap 323; the gear shaft hole 122 extends through the third clamping plate 121. The mode switching device 4 further includes a gear shaft 41 inserted into the gear shaft hole 122 and inserted into the first slide hole 324 or the second slide hole 325. The projection of the first slide hole 324 on the third clamping plate 121 forms an intersection region with the projection of the second slide hole 325 on the third clamping plate 121; and the gear shaft hole 122 is provided in the intersection region, inside of which the gear shaft 41 is placed, which may slide within the first slide hole 324 or the second slide hole 325. The width of the first slide hole 324 and the width of the second slide hole 325 are larger than the diameter of the gear shaft 41, which is convenient for the gear shaft 41 to slide within either of the slide holes.

When the mode switching device 4 is in the conventional mode, the gear shaft 41 is inserted into the gear shaft hole 122 and the first slide hole 324, and the gear shaft 41 slides within the first slide hole 324 during opening or closing of the opening-closing device; and when the mode switching device 4 is in the labor-saving mode, the gear shaft 41 is inserted into the gear shaft hole 122 and the second slide hole 325, the gear shaft 41 slides within the second slide hole 325 during opening or closing of the opening-closing device.

Figure 8:
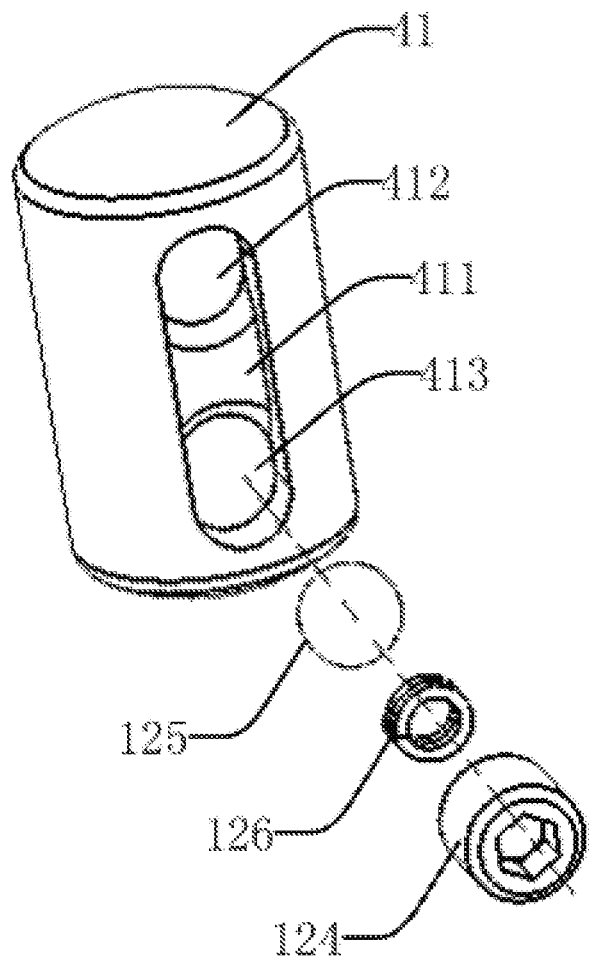
FIG. 8 is a structural schematic view of a gear shaft and a gear shaft positioning device according to the embodiment of the present invention.
Figure 11:
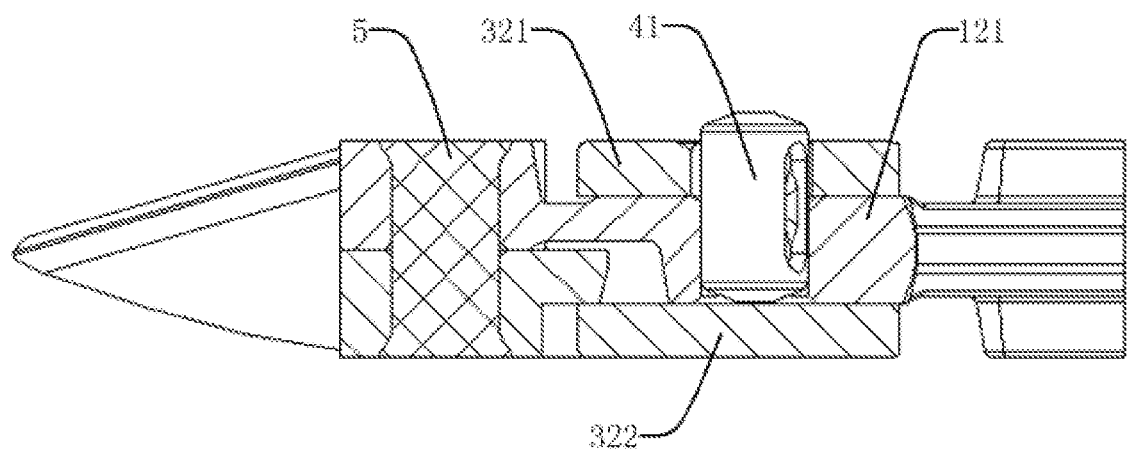
FIG. 11 is a cross-sectional view AA of FIG. 10.
Figure 14:
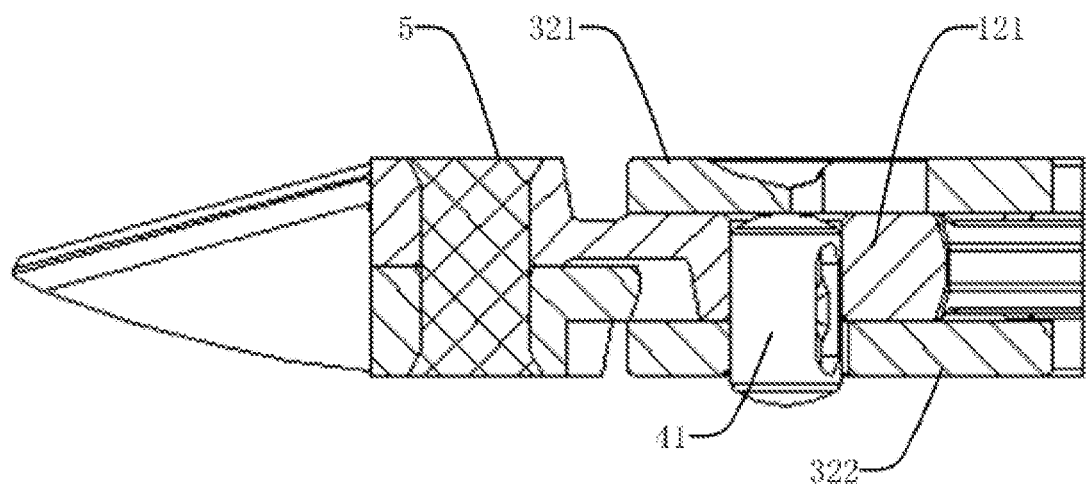
FIG. 14 is a cross-sectional view BB of FIG. 13.

As shown in FIGS. 8, 11 and 14, the gear shaft 41 is slidable up and down within the gear shaft hole 122. The gear shaft 41 includes a kidney-shaped slot 411 and two gear pockets 412 and 413; the kidney-shaped slot 411 is vertically provided on the side wall of the gear shaft 41, and the two gear pockets 412 are provided on the bottom of the kidney-shaped slot 411 from above, respectively.

Figure 5:
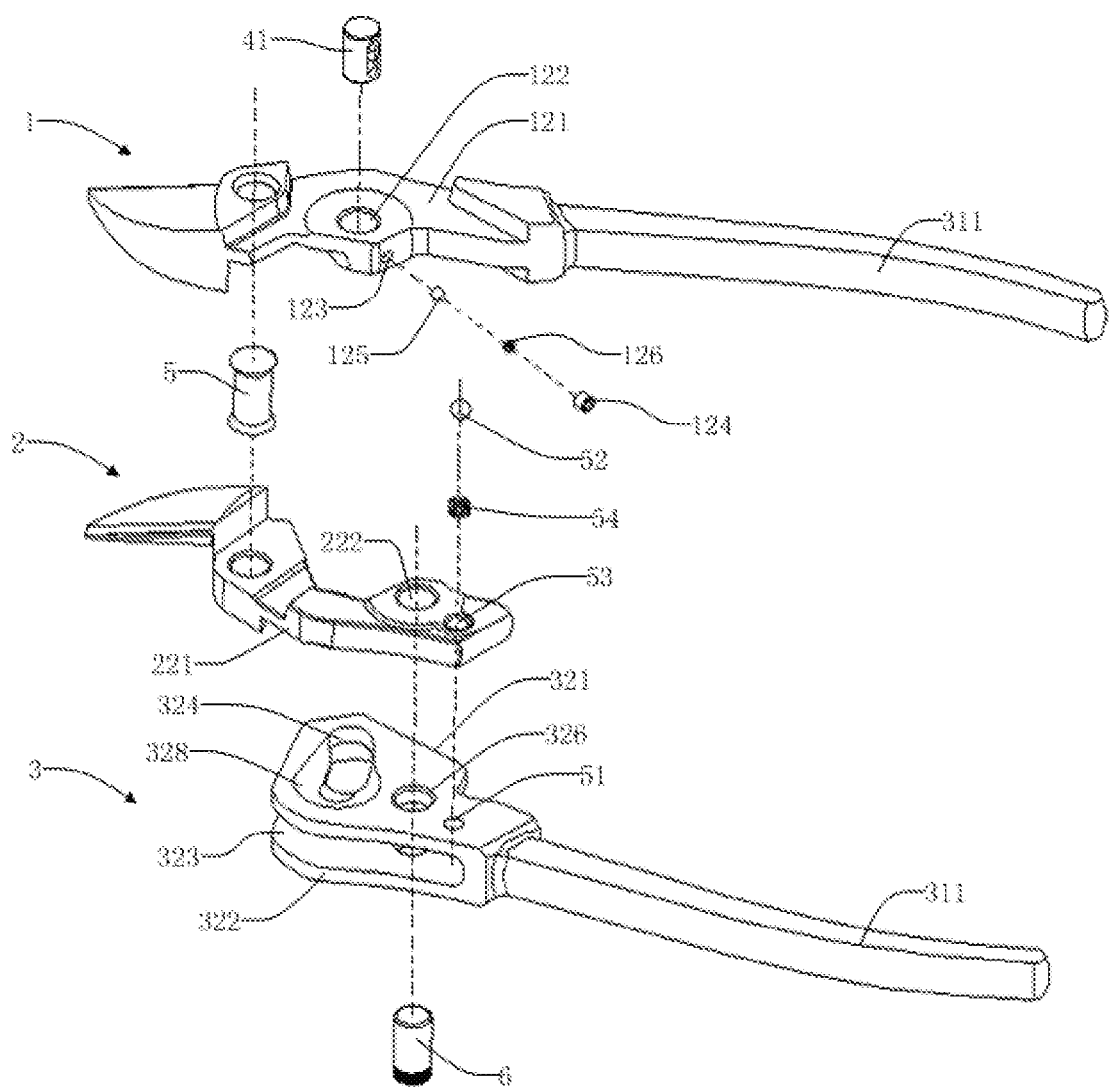
FIG. 5 is an exploded schematic view of the embodiment of the present invention in another state.
Figure 6:
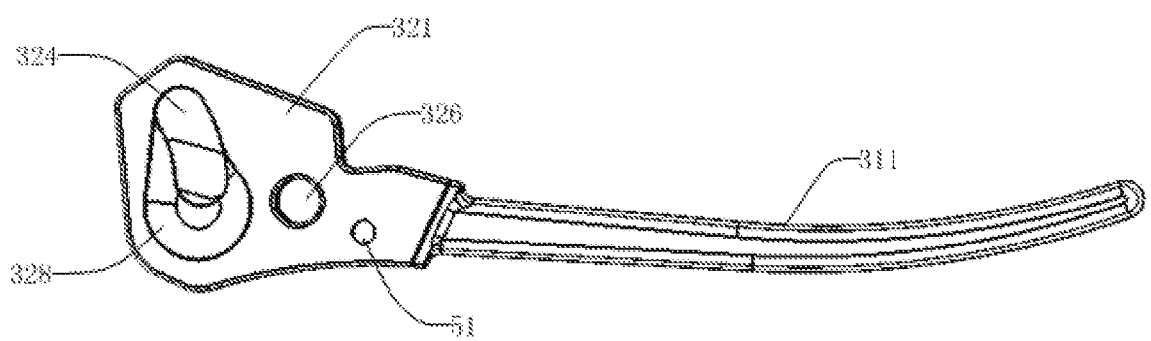
FIG. 6 is a schematic view of the front structure of a third component according to the embodiment of the present invention.
Figure 7:
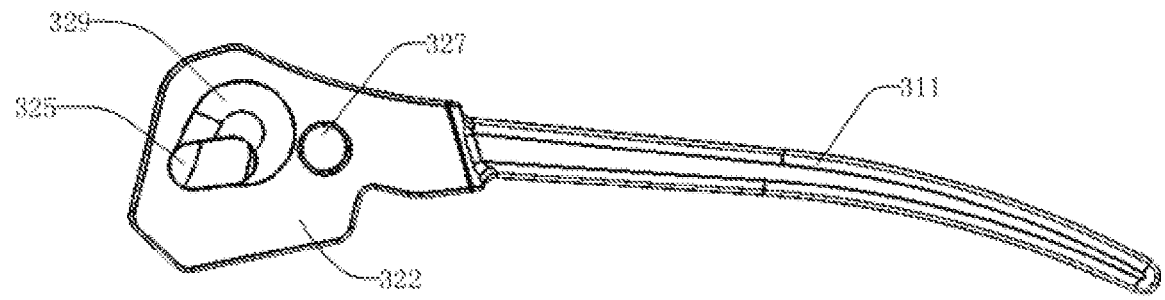
FIG. 7 is a schematic view of the back structure of a third component according to the embodiment of the present invention.

As shown in FIGS. 5 and 8, the first switching portion 12 is further provided with a gear shaft positioning device which specifically includes a first shaft pin hole 123, a positioning pin 124, a first positioning ball 125 and a first positioning spring 126; the first positioning ball 125, the first positioning spring 126 and the first positioning pin 124 are provided within the first shaft pin hole 324 sequentially from within, the first positioning ball 125, the first positioning spring 126 and the first positioning pin 124 together constitute the gear shaft positioning device. The first shaft pin hole 123 extends through the side wall of the gear shaft hole 122, on the inner side wall of which shaft pin thread (not shown) is provided; the outer side wall of the positioning pin 124 is provided with positioning pin thread which corresponds to the shaft pin thread; the first positioning ball 125 is snapped into one of the gear pockets 412/413; one end of the first positioning spring 126 is tangent to the first positioning ball 125 and the other end thereof is tangent to the positioning pin 124. The inner side of the positioning pin 124 is tangent to the first positioning ball 125 and the outer side of the positioning pin 124 is provided with a blade bayonet which allows to be rotated into or rotated out of the positioning pin 124 within the first shaft pin hole 324 by a user using a screwdriver to adjust the snapping of the first positioning ball 125 into the two gear pockets.

The two gear pockets are the first gear pocket 412 and the second gear pocket 413, respectively; the mode switching device 4 is in the conventional mode when the first positioning ball 125 is snapped into the first gear pocket 412; and the opening-closing device is in the labor-saving mode when the first positioning ball 125 is snapped into the second gear pocket 413. The first positioning ball 125 may slide from one gear pocket 412 to the other gear pocket 412 to switch the operating mode of the opening-closing device when the gear shaft 41 is pushed under force.

The third switching portion 32 includes a first press groove 328 and a second press groove 329, the first press groove 328 is provided on the outer side of the first clamping plate 321 and is communicated to the first slide hole 324; and the second press groove 329 is provided on the outer side of the second clamping plate 322 and is communicated to the second slide hole 325. In the first clamping plate 321 and the second clamping plate 322, the sides opposite to each other are the inner sides, and the sides away from the clamping plate gap 323 are the outer sides.

The two press grooves are shaped to be round, which corresponds to the shape of the thumb belly, which is convenient for the user to press down the gear shaft 41 in the first press groove 328 or the second press groove 329 to switch the operating mode of the opening-closing device.

As shown in FIGS. 5 to 7 and 9, the second switching portion 22 includes a fourth clamping plate 221 inserted into the clamping plate gap 323; and the second pin shaft 6 sequentially passes through the first clamping plate 321, the fourth clamping plate 221 and the second clamping plate 322. Specifically, the second switching portion 22 includes a second shaft pin hole 222 extending through the fourth clamping plate 221, the third switching portion 32 further includes a third shaft pin hole 326 and a fourth shaft pin hole 327; the third shaft pin hole 326 extends through the first clamping plate 321; the fourth shaft pin hole 327 extends through the second clamping plate 322; the second pin shaft 6 sequentially passes through the third shaft pin hole 326, the second shaft pin hole 222 and the fourth shaft pin hole 327. The second switching portion 22 and the third switching portion 32 are rotatably connected via the second pin shaft 6, and the second component 2 and the third component 3 may be rotated relative to each other within a certain angular range when the mode switching device 4 is in the labor-saving mode.

Figure 9:
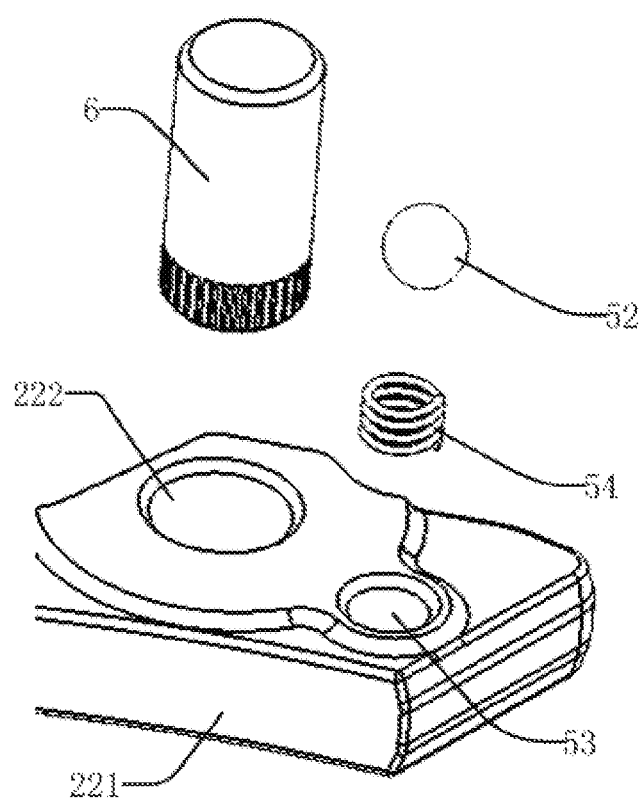
FIG. 9 is a structural schematic view of a stop device according to the embodiment of the present invention.

As shown in FIGS. 5 and 9, the mode switching device 4 is also provided with a stop device which specifically includes a stop hole 51, a second positioning ball 52, a stop groove 53 and a second positioning spring 54, the second positioning spring 54 and the second positioning ball 52 are provided within the stop groove 53 sequentially from within. The stop hole 51 extends through the first clamping plate 321; the second positioning ball 52 is snapped into the stop hole 51; the stop groove 53 is recessed down to the surface of the fourth clamping plate 221, and the groove opening of the stop groove 53 corresponds to the stop hole 51; one end of the second positioning spring 54 is tangent to the second positioning ball 52 and the other end thereof is tangent to the bottom surface of the stop groove 53.

When the mode switching device 4 is in the conventional mode, the second positioning ball 52 is snapped into the stop hole 51, thereby locking the second component 2 and the third component 3. In the conventional mode, if the opening-closing device is in the open state, the gear shaft 41 slides within the first slide hole 324, and the first slide hole 324 is an arc-shaped hole with the center on the shaft axial of the first pin shaft 5, so the direction of movement of the second component 2 and the direction of movement of the third component 3 are exactly consistent, and the second positioning ball 52 would not slide out from the stop hole 51 under force, so that the second component 2 and the third component 3 may remain fixed relative to each other.

When the mode switching device 4 is in the labor-saving mode, if the opening-closing device is in the closed state, the second positioning ball 52 is snapped into the stop hole 51, and if the opening-closing device is in the open state, the gear shaft 41 slides within the second slide hole 325, and the second slide hole 325 is a kidney-shaped hole which is oriented to face the second pin shaft 6, the direction of movement of the second component 2 and the direction of movement of the third component 3 are not consistent during opening or closing. Therefore, the second positioning ball 52 would slide out from the stop hole 51 under force, thereby being unlocked.

The first handheld portion 13 includes, but is not limited to, a first handle 131 and a first sheath 132, and the second handheld portion 31 includes, but is not limited to, a second handle 311 and a second sheath 312, the first sheath 132 covers the outer surface of the first handle 131, and the second sheath 312 covers the outer surface of the second handle 311.

Figure 10:
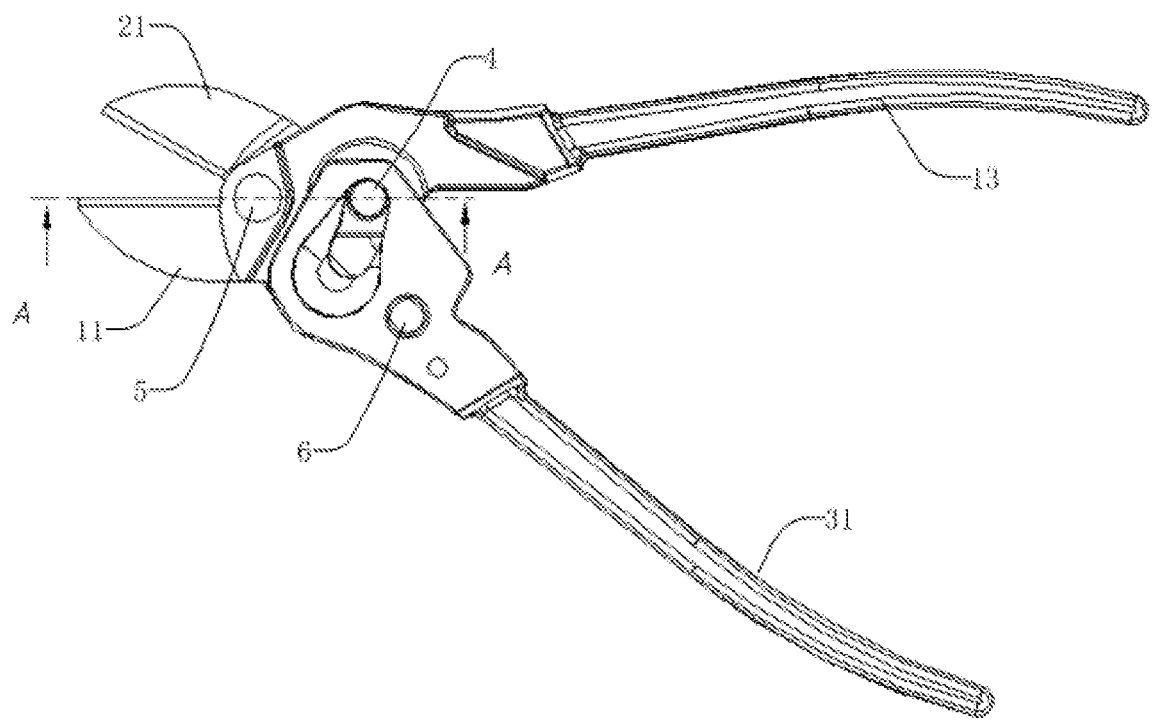
FIG. 10 is a schematic view of the front structure of the embodiment of the present invention in the open state in the conventional mode.

FIG. 10 is a schematic view of the structure of the present embodiment in the open state in the conventional mode, and FIG. 11 is a schematic view of the position of the gear shaft 41 according to the present embodiment in the conventional mode. As shown in FIGS. 10 to 11, if the mode switching device 4 is in the conventional mode, the first positioning ball 125 is snapped into the first gear pocket 412, the gear shaft 41 is inserted into the gear shaft hole 122 and the first slide hole 324, the second component 2 and the third component 3 remain fixed relative to each other. The range of the curvature of the first slide hole 324 determines the maximum opening angle of the two clamping portions of the present embodiment at the conventional gear, the range of the curvature of the first slide hole 324 according to the present embodiment is preferably 15 to 45 degrees, and the range of the opening angle of the two clamping portions of the present embodiment is also 15 to 45 degrees and the maximum opening angle is 45 degrees.

Figure 12:
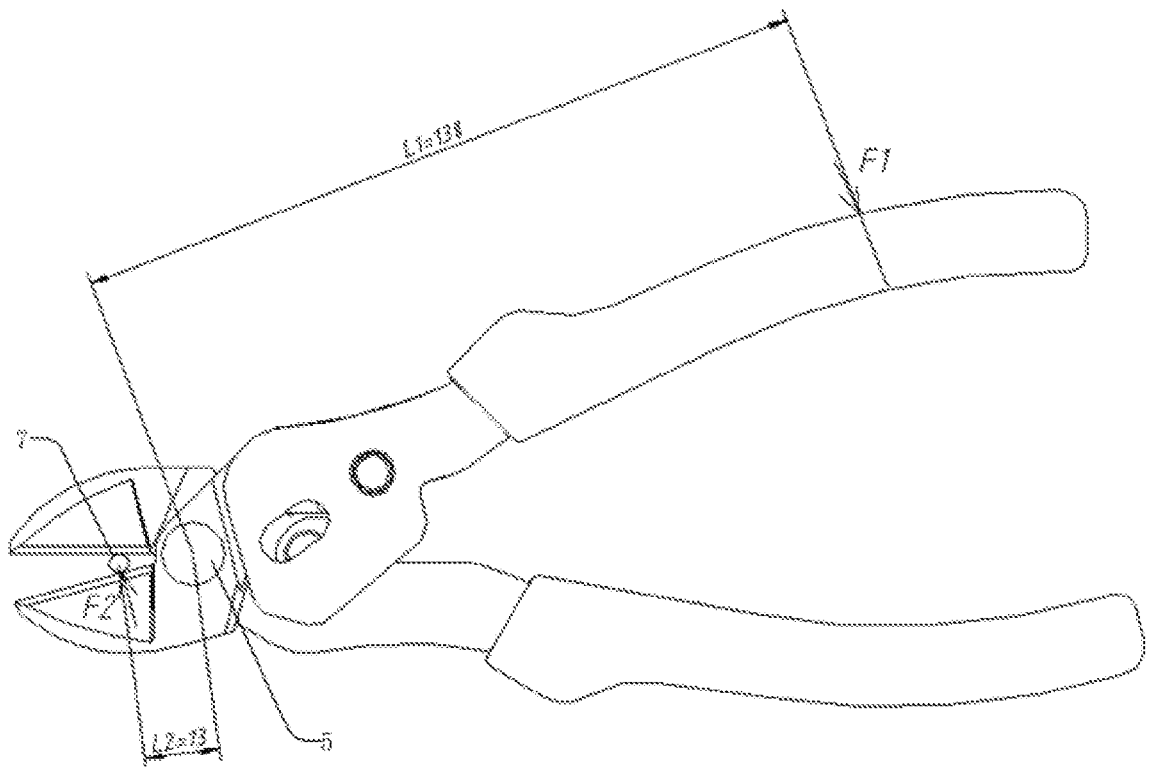
FIG. 12 is a schematic view of the back force analysis of the embodiment of the present invention in the open state in the conventional mode.

FIG. 12 is a schematic view of the force analysis of the present embodiment in the open state in the conventional mode, in the opening-closing device shown in FIG. 12, two outer points of the handheld portions as applying force points are taken as an example, a wire product 7 is cut using the two clamping portions. Wherein, the lever fulcrum is the first pin shaft 5, the transmission ratio is F2/F1=L1/L2=130/13=10, that is, the magnitude of the applied force F2 of the product 7 is 10 times the magnitude of the applying force F1 on the handles. If you need the diameter of the product to be cut to be small or the hardness thereof to be low, you will just use the conventional pliers, and adjust the present invention to be in the conventional mode.

Figure 13:
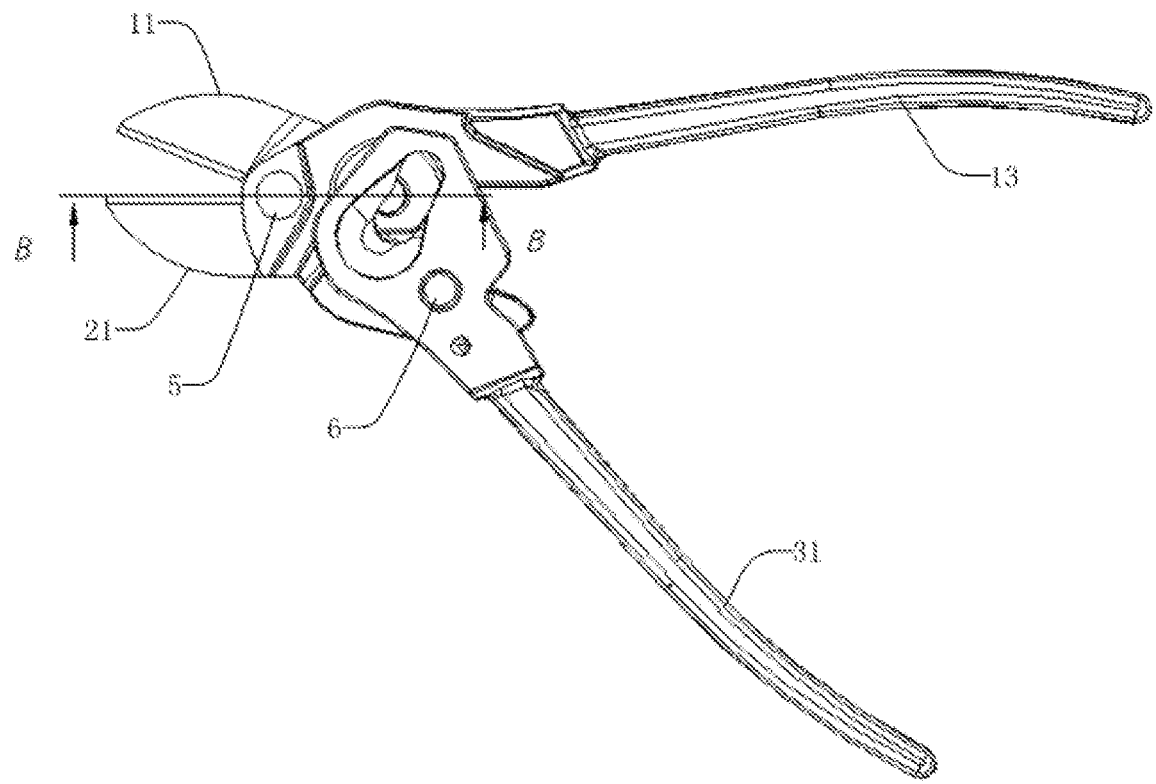
FIG. 13 is a schematic view of the front structure of the embodiment of the present invention in the open state in the labor-saving mode.

FIG. 13 is a schematic view of the structure of the present embodiment in the open state in the labor-saving mode, and FIG. 14 is a schematic view of the position of the gear shaft 41 according to the present embodiment in the labor-saving mode. As shown in FIGS. 13 to 14, if the mode switching device 4 is in the labor-saving mode, the gear shaft 41 is inserted into the gear shaft hole 122 and the second slide hole 325, and the gear shaft 41 is slidable within the second slide hole 325, so that the second component 2 and the third component 3 can be rotated relative to each other.

Figure 15:
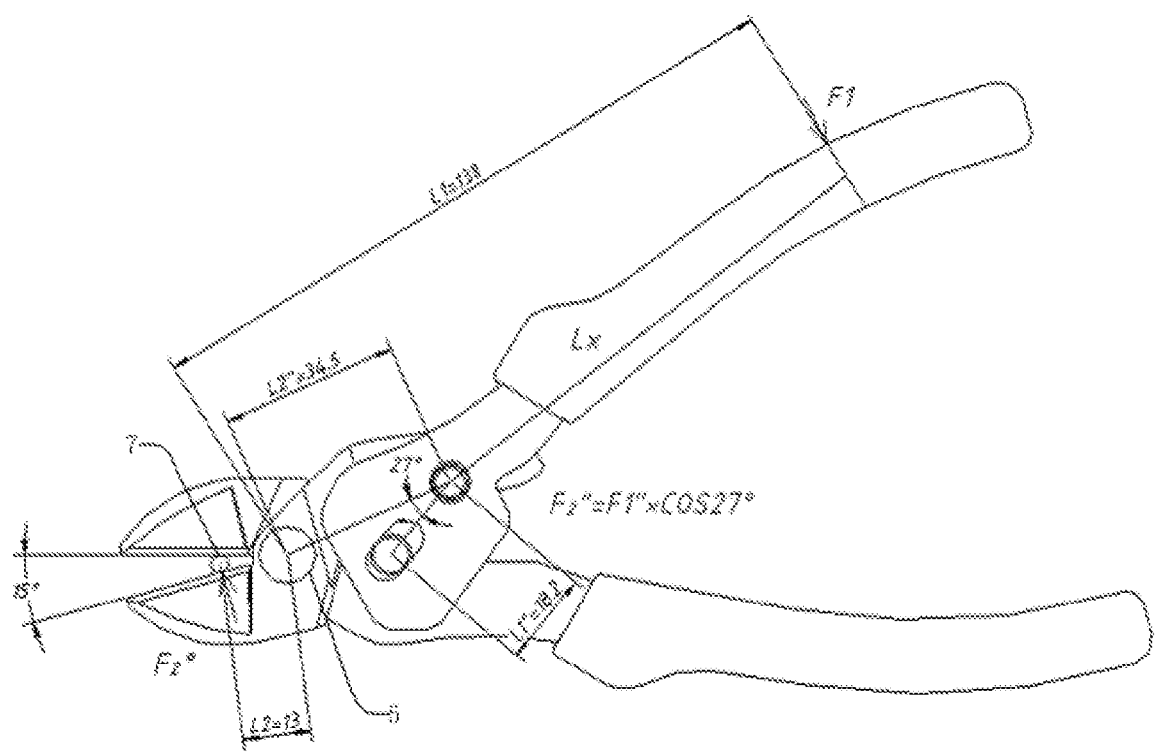
FIG. 15 is a schematic view of the back force analysis of the embodiment of the present invention in the open state in the labor-saving mode.

FIG. 15 is a schematic view of the force analysis of the present embodiment in the open state in the labor-saving mode, in the opening-closing device shown in FIG. 15, two outer points of the handheld portions as the applying force points are taken as an example, a wire product 7 is cut using the two clamping portions. As shown in FIG. 15, the present embodiment uses the first pin shaft 5 as the first lever fulcrum and the gear shaft as the second lever fulcrum to form a secondary lever structure to increase the transmission ratio of the transmission system of the present invention, so that the labor-saving effect of the entire system is better than the effect of the conventional tool pliers. The transmission ratio is as follows: F1"/F1*F2/F2"32 L1/L1"*L2"/L2=113.7/18.2+34.5/13=16.6*COS27°=15, that is, the magnitude of the applied force F2 of the wire product 7 is 15 times the magnitude of the applying force F1 on the handles. If you need the diameter of the product to be cut to be small or the hardness thereof to be low, you'll just use the labor-saving pliers, and only adjust the present invention to be in the labor-saving mode.

On the premise that the user applies the same force on the same applying force point, the magnitude of the applied force of the wire product 7 in the labor-saving mode is 1.5 times the magnitude of the applied force thereof in the conventional mode, and the applied force of the wire products 7 is increased by 50% in the labor-saving mode, the clamping or cutting effect can be better improved.

On the premise that the wire product 7 is applied with the same force, the user only need to apply two-thirds of the force in the conventional mode on the same applying force point in the labor-saving mode, the same cutting or clamping effect as in the conventional mode can be achieved, the user can save one-third of the applying force.

If the operation mode of the present embodiment needs to be switched from the conventional mode to the labor-saving mode, the user places the finger on the first press groove 328, presses the gear shaft 41 downward, and the gear shaft 41 slides out from the first slide hole 324 until being snapped into the second slide hole 325.

If the operation mode of the present embodiment needs to be switched from the labor-saving mode to the conventional mode, the user places the finger on the second press groove 329, presses the gear shaft 41 downward, and the gear shaft 41 slides out from the second slide hole 325 until being snapped into the first slide hole 324.

An advantage of the present invention is to provide an opening-closing device having two functions of a labor-saving opening-closing device with a larger handles opening angle and a conventional opening-closing device, such as labor-saving pliers and conventional tool pliers, and having a labor-saving mode and a conventional mode, the two operating modes are easily switched by means of a mode switching device, so that a user can choose a mode based on actual needs. The invention can effectively solve the technical problems that the prior art labor-saving opening-closing device may only be available for some special occasions, and is inconvenient to use in the conventional occasions, has single function, and the like.

The foregoing is only preferred embodiment of the present invention, and it should be noted that several variations and modifications may be made by those skilled in the art without departing from the principles of the invention, and the variations and modifications should also be regarded as the scope of protection of the present invention.

The invention claimed is:

1. An opening-closing device comprising:
   a first component;
   a second component rotatably connected with the first component; and
   a third component rotatably connected with the second component;
   wherein the opening-closing device comprises:
   a mode switching device for switching operating modes of the opening-closing device; the operating modes comprise a conventional mode and a labor-saving mode;
   when the opening-closing device is in the conventional mode, the third component is fixed relative to the second component;

when the opening-closing device is in the labor-saving mode, the third component is rotated in the opening direction relative to the second component during opening of the opening-closing device, and the third component is rotated in the closing direction relative to the second component during closing of the opening-closing device.

2. The opening-closing device according to claim 1, wherein
the first component comprises a first clamping portion and a first handheld portion;
the second component comprises a second clamping portion provided opposite to the first clamping portion;
the third component comprises a second handheld portion provided opposite to the first handheld portion; and
the first clamping portion and the second clamping portion are rotatably connected via a first pin shaft.

3. The opening-closing device according to claim 2, wherein the mode switching device comprises:
a first switching portion with one end thereof connected to the first clamping portion and the other end thereof connected to the first handheld portion;
a second switching portion connected to the second clamping portion; and
a third switching portion connected to the second handheld portion;
wherein the second switching portion and the third switching portion are rotatably connected via a second pin shaft.

4. The opening-closing device according to claim 3, wherein the third switching portion comprises:
a first clamping plate connected to the second handheld portion;
a second clamping plate connected to the second holing portion and parallel to the first clamping plate;
a clamping plate gap provided between the first clamping plate and the second clamping plate;
a first slide hole extending through the first clamping plate; and
a second slide hole extending through the second clamping plate.

5. The opening closing device according to claim 4, wherein the first switching portion comprises:
a third clamping plate inserted into the clamping plate gap; and
a gear shaft hole extending through the third clamping plate;
wherein the projection of the first slide hole on the third clamping plate forms an intersection region with the projection of the second slide hole on the third clamping plate; and the gear shaft hole is provided within the intersection region.

6. The opening-closing device according to claim 5, wherein the mode switching device further comprises:
a gear shaft inserted into the gear shaft hole and inserted into the first slide hole or the second slide hole;
the gear shaft slides within the first slide hole during opening or closing of the opening closing device when the opening-closing device is in the conventional mode; and
the gear shaft slides within the second slide hole during opening or closing of the opening closing device when the opening-closing device is in the labor-saving mode.

7. The opening-closing device according to claim 6, wherein the gear shaft comprises a kidney-shaped slot vertically provided on the side wall of the gear shaft; and two gear pockets provided on the bottom of the kidney-shaped slot.

8. The opening-closing device according to claim 6, wherein the first switching portion further comprises:
a first shaft pin hole extending through the side wall of the gear shaft hole, and the inner side wall of which is provided with shaft pin thread;
a positioning pin with the outer side wall thereof provided with positioning pin thread corresponding to the shaft pin thread;
a first positioning ball snapped into either of the gear pockets; and
a first positioning spring with one end thereof tangent to the first positioning ball and the other end thereof tangent to the positioning pin;
wherein the first positioning ball, the first positioning spring and the positioning pin are provided, sequentially from inner to outer, within the first shaft pin hole.

9. The opening-closing device according to claim 8, wherein
the two gear pockets are a first gear pocket and a second gear pocket, respectively;
the opening-closing device is in the conventional mode when the first positioning ball is snapped into the first gear pocket; and
the opening-closing device is in the labor-saving mode when the first positioning ball is snapped into the second gear pocket.

10. The opening-closing device according to claim 1, wherein the device comprises pliers.

* * * * *